United States Patent [19]

Tomlin et al.

[11] 4,385,746
[45] May 31, 1983

[54] FOUR-WAY PLUG VALVE

[75] Inventors: Jerry B. Tomlin, Sugar Land; Herbert H. Hodgeman, Houston, both of Tex.

[73] Assignee: Daniel Industries, Inc., Houston, Tex.

[21] Appl. No.: 248,313

[22] Filed: Mar. 27, 1981

Related U.S. Application Data

[62] Division of Ser. No. 31,219, Apr. 18, 1979, Pat. No. 4,286,625.

[51] Int. Cl.³ ............... F16K 5/16; F16K 11/083; F16K 39/06
[52] U.S. Cl. ............................. 251/56; 251/175; 251/192; 251/285; 251/287; 137/625.43
[58] Field of Search ............... 137/625.43, 493.8; 251/56, 285, 287, 175, 192

[56] References Cited

U.S. PATENT DOCUMENTS

| | | | |
|---|---|---|---|
| 2,054,259 | 9/1936 | Kinzie | 251/56 X |
| 2,085,688 | 6/1937 | Schuchman et al. | 251/56 X |
| 2,149,725 | 3/1939 | Canarlis | 251/56 X |

Primary Examiner—Arnold Rosenthal
Attorney, Agent, or Firm—Gunn, Lee & Jackson

[57] ABSTRACT

A rotary lift-turn type plug valve mechanism includes a valve body and bonnet structure defining a tapered valve chamber that receives a tapered plug member which is operated by linear and rotary components of movement to achieve valve operation. Externally adjustable plug positioning means is provided by the valve mechanism to enable the position of the plug element to be adjusted relative to the inlet and outlet flow passages defined by the valve body. Plug dampening means is also provided for applying a dampening force to the plug element to prevent slamming of the plug upon reaching the end of a rotational component of movement. A valve actuator is also provided that operatively engages the valve stem of the plug and is capable of imparting both linear and rotary components of movement to the valve stem for unseating, rotating and reseating the valve element within the valve chamber. A system is provided for maintenance of predetermined pressure differential across the sealing elements of the valve and to compensate for volumetric changes as the valve element is seated and unseated.

5 Claims, 15 Drawing Figures

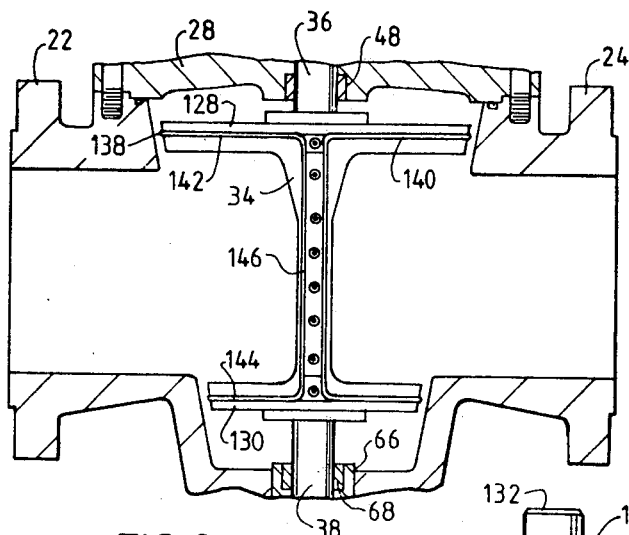
FIG. 6
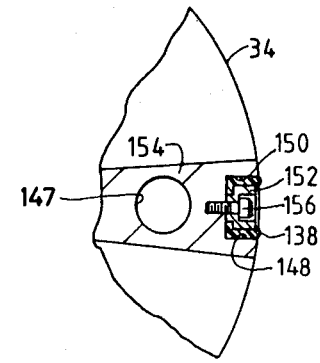
FIG. 10
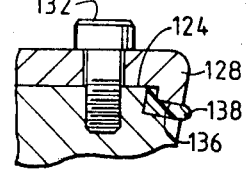
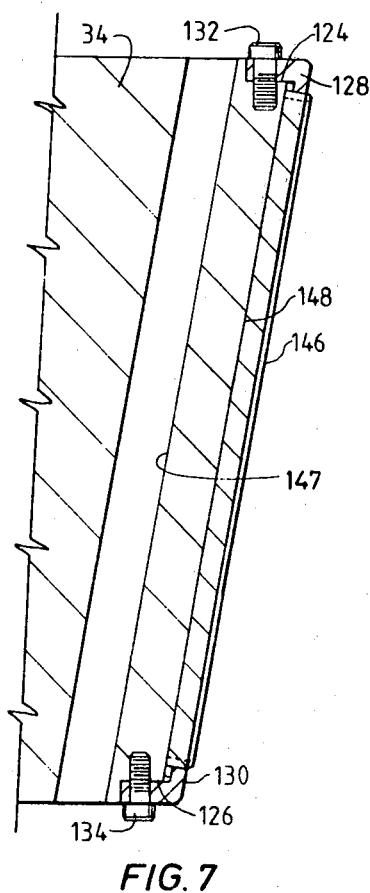
FIG. 7
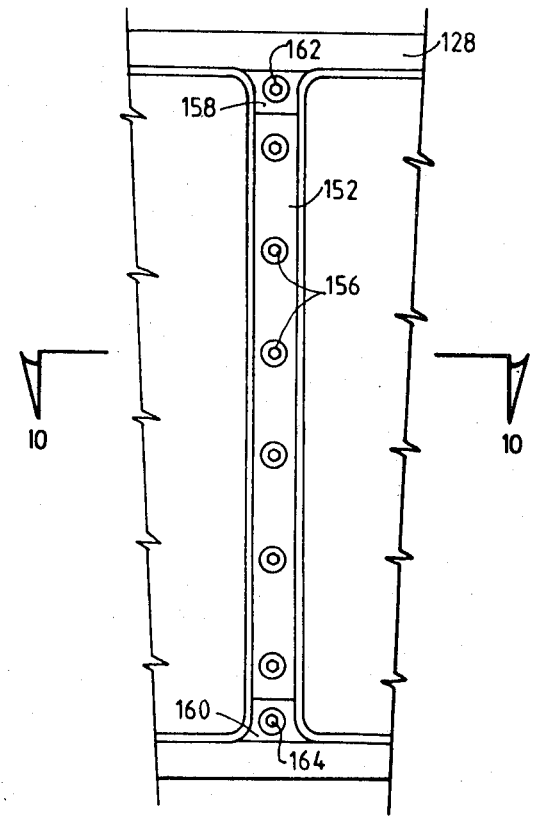
FIG. 9

FOUR-WAY PLUG VALVE

This is a division of application Ser. No. 031,219 filed Apr. 18, 1979, now U.S. Pat. No. 4,286,625 dated Sept. 1, 1981.

FIELD OF THE INVENTION

This invention relates generally to rotary plug valves and, in particular, four-way plug valves that control the flow of fluid in a flow conduit system. More particularly, the present invention relates to a lift plug type plug valve mechanism wherein the plug element and valve chamber of the valve are of frusto-conical mating configuration and the plug element is operated by a linear unseating movement, a rotational movement to reposition the plug element relative to the flow conduit system and an opposite linear movement for reseating the plug element relative to the seating surfaces defined by the valve chamber. Even more specifically, the present invention relates to a rotary plug valve mechanism incorporating externally adjustable means for proper orientation of the plug element relative to inlet and outlet flow passages and a dampening system for preventing slamming of the plug element as it reaches an extremity of its rotational movement.

BACKGROUND OF THE INVENTION

It will be apparent from the following disclosure that the present invention has particular utility in conjunction with four-way type plug valves. It should be borne in mind, however, that the present invention also has utility from the standpoint of rotary plug valves other than four-way plug valves. For purposes of simplicity, however, the invention is described particularly as it relates to four-way plug valve mechanisms.

Plug valves may be classified in three basic classes, i.e. cylindrical plug valves, tapered or conical plug valves and spherical plug valves, which are commonly referred to as ball valves. With regard specifically to tapered plug valves, these may be classified as simple rotary valves wherein the plug element is simply rotated within the valve body for controlling the flow of movement through the valve mechanism. In order to protect the sealing elements and sealing surfaces of tapered plug valves from excessive wear, plug valves have been developed that are operated by lifting the tapered plug element or shifting it linearly to unseat or separate the sealing element of the plug from the seating surfaces defined within the valve body. After the unseating movement, the plug element is then rotated to the proper position and is then moved linearly in the opposite direction to again seat the sealing element of the plug in sealing engagement with the seating surfaces of the valve body. As the plug element is rotated during operation of the valve mechanism, the sealing element often carried by the plug is not in engagement with any internal seating surfaces and therefore no wear occurs during such movement. The service life of such lift-turn type plug valves is therefore materially enhanced. Providing a lift-turn capability for plug valve mechanisms is especially important when large plug valves are mployed because of the length of seal travel during operational movements.

When four-way type lift plug valve mechanisms are incorporated in meter prover systems, it is necessary for such valve mechanisms to be cycled quite frequently. It is therefore desirable to provide a plug valve mechanism that does not become excessively worn because of rapid, frequent cycling.

Where large plug valves are employed in fluid flow control apparatus, such as flowmeter loops, the valve mechanisms are typically cycled quite rapidly, i.e. moved from one operative position to another in a period of several seconds duration. Where the plug valve mechanisms are of large size, the internal rotatable plug elements will be quite massive and will have considerable weight. Typically, forces of inertia necessary to start and stop the rotational movement of the plug element is absorbed by the structural components of the valve actuator that achieves linear and rotational movement of the plug. Because of the severe inertia forces that are transmitted to the valve actuator system are quite severe, the valve actuator mechanism is typically of extremely durable and expensive manufacture in order to compensate for these forces as much as possible. Ordinarily, inertia forces are not excessively severe as rotational movement of the plug element is initiated. At the end of the rotational stroke, however, the valve actuator is suddenly stopped and a severe inertial force will be transmitted from the plug member through the valve actuator mechanism as rotational movement of the plug member is abruptly topped. It is desirable to provide means for insuring the severe inertial forces are not transmitted to the valve actuator mechanism. This will insure that the valve actuator will provide extended service life and will facilitate less expensive manufacture of the valve actuator mechanism.

As the valve actuator and other valve components become worn, it is typical for the flow port of the plug member to become misaligned with respect to the inlet and outlet passages of the valve mechanism. When the port is misaligned with the inlet and outlet flow passages, turbulence can be developed that will impede the flow of fluid through the valve mechanism. Also, especially in large valve mechanisms, the seat surfaces and sealing surfaces of the valve body and plug member may become misaligned if the position of the plug at the end of its operational stroke becomes changed. In this case, the valve will not seal properly and must be typically disassembled for repair. Alternatively, in some cases the valve actuator may be adjusted to modify the stopping position of the plug member, depending upon the characteristics of the valve actuator. It is desirable to provide means for simply and efficiently adjusting the stopping position of the plug member within the valve body and it is also desirable to provide adjustment means that is capable of external adjustment to insure against the necessity to disassemble the valve for adjustment.

Where a high degree of seal integrity is mandatory in plug valve mechanisms, it is desirable to determine if a proper seal is established each time the plug member is shifted linearly to a sealing position. If the valve should leak even a small amount with the plug at its sealing position, then it may be necessary to disregard a meter loop measurement for the purpose of checking the accuracy of a flowmeter. It is desirable to insure that the four-way plug valve is sealing properly at each operational run of the flowmeter loop in order that the known volume of the flowmeter loop may be checked against the particular measurement of the flowmeter involved. It is desirable to provide means or insuring the seal integrity of the plug valve mechanism during each prover run.

In some cases, the tapered plug elements of lift-turn type four-way plug valves are formed to define pairs of seal grooves and sealing material, such as a suitable elastomeric or plastic material, is molded within these grooves in order to define the sealing elements of the plug. In the event these molded seal elements become worn to the point that replacement is desired, the valve must be disassembled to remove the plug element. Typically, to place the valve back in service as soon as possible, a substitute plug is installed. The plug member having the worn seal is then transferred to a repair facility where the seal grooves will be cleaned and new sealing material installed. The reconditioned plug member will then be placed in readiness for future repair operations. In other cases, the tapered plug members are formed to define grooves having small seal openings through which the sealing portion of sealing elements extend with the seal grooves being formed to mechanically retain the sealing elements against displacement from the seal groove by the forces of the flowing fluid. These types of seals are not typically satisfactory because they are rather easily extruded from the seal grooves by fluid forces and are rather easily damaged. When servicing is required, however, these types of plugs can be repaired very simply by removing the worn or damaged seals and by simply inserting replacement seals. It is desirable to provide a plug valve mechanism incorporating sealing elements that are field replaceable but which are mechanically retained within seal grooves to the extent that the seals will effectively resist ordinary seal extrusion and damage and will function quite satisfactorily at high operating pressures or under the influence of high volume fluid flow.

When tapered rotary plug valves are lifted for unseating and moved downwardly for seating movement as well as being rotated during fluid controlling movement, differential volumetric changes typically occur. The spaces defined between the valve element and the large and small extremities of the valve typically vary substantially in volume. During seating and unseating movement, the plug member is moved linearly with seals established between the plug member and the inner surfaces of the valve body. During such plug movement negative and positive fluid pressures typically develop that retard plug movement and therefore subject the valve actuator system to greater forces than might be desirable. It is desirable to provide means for insuring maintenance of a predetermined maximum pressure differential across the sealing elements of the valve during seating and unseating movement and to minimize the effect of any operator retarding forces due to positive and negative pressures.

In view of the foregoing, it is a primary feature of the present invention to provide a novel four-way lift plug type valve mechanism incorporating a dampening system that effectively reduces inertial forces that might otherwise be transmitted from the rotatable plug member to the valve actuating mechanism thereof.

It is also a feature of the present invention to provide a novel four-way lift turn type plug valve mechanism that incorporates an externally adjustable plug positioning mechanism that allows the stopping position of the plug at the end of its rotational movement to be changed without necessitating disassembly of the valve mechanism or modification of the valve actuator system.

Among the several features of the present invention is contemplated a novel lift-turn type plug valve mechanism incorporating means for checking the integrity of the seal each time the plug member is positioned at the seal position thereof.

It is also a feature of the present invention to provide a four-way lift turn type plug valve mechanism incorporating a fluid transfer system for purposes of dampening rotational movement of the plug element, which fluid dampening system incorporates a pair of schematically parallel fluid flow conduits, each including relief valves for allowing unidirectional flow of dampening fluid through each of the schematically parallel conduits.

It is a further feature of the present invention to incorporate in conjunction with a four-way lift turn type valve mechanism a plural relief valve system allowing fluid flow at different selected pressures depending upon the direction of flow through the relief valve mechanism.

It is also a feature of the present invention to incorporate in conjunction with a four-way plug valve mechanism a plural relief valve system incorporating two relief valves with the flow of fluid in one direction through the relief valve mechanism causing opening of a first relief valve while simultaneously applying a closing fluid pressure to the second relief valve and flow of dampening fluid in the opposite direction through the relief valve mechanism induces opening of the second relief valve while simultaneously assisting in closure of the first relief valve.

It is another provision of this invention to provide a novel four-way valve mechanism having the capability of compensating for volumetric changes within the valve chamber and minimizing any actuator retarding forces that might otherwise develop.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

In accordance with the present invention, a four-way lift-turn type rotary plug valve is provided which includes a tapered plug member that is operated within a valve body by both linear and rotary components of movement. The plug member is moved linearly for unseating the sealing elements of the plug from the seating surfaces defined within the valve body and is then rotated to a preselected position. After rotation, the plug member is again moved linearly to reseat the sealing elements of the plug in sealing engagement with the seating surfaces of the valve body. To position the plug member in accurate registry with the inlet and outlet passages of the valve mechanism, a plug positioning element extends through an aperture formed in the valve bonnet and positions an eccentric portion thereof within the valve chamber. A detent or stop projection provided on the plug member is moved into engagement with the eccentric portion of the plug positioning element to provide a stop for positioning the plug with respect to the inlet and outlet flow passages. To enable the stop position of the plug to be changed, the eccentric stop portion of the plug positioning element may be selectively oriented. The plug positioning element is formed to define a flange having a plurality of bolt openings formed therein that may be brought into registry with internally threaded bolt openings formed in the bonnet structure of the valve. By simply unbolting the flange of the plug positioning element and rotating it to align the bolt openings thereof with respect to other ones of the internally threaded bolt openings, the position of the eccentric portion of the plug positioning element will be changed slightly and the stop projection of the plug member will engage a different portion of the eccentric surface, thus slightly altering the position of registry between the plug member and the valve body.

The plug element is formed to define seal recess grooves at the upper and lower portions thereof for receiving pairs of sealing elements. Seal retainer elements, including an elongated retainer bar cooperating with a pair of retainer end pieces, functions cooperatively with the plug structure to define opposed parallel groove portions for retaining portions of each of the sealing elements.

Apparatus is also provided for determining the integrity of the seal that is established each time the plug element is moved into the sealing position thereof. The seal detection apparatus incorporates means for detecting pressure changes within the valve chamber after the sealing elements have been brought into sealing engagement with the body. Such pressure changes indicate that a proper seal has not been established. A pressure responsive switch or other monitoring system may be utilized in conjunction with the valve chamber to enable the pressure within the valve chamber to be inspected electrically and to insure automatic rejection of flowmeter runs in the event the value should fail to establish a proper seal when seated.

Apparatus is also provided to compensate for volumetric changes as the plug element is moed linearly during seating and unseating movement and to prevent the development of excessive positive and negative pressures during such seating and unseating movements. A fluid flow passage is formed in the plug element for the purpose of placing the upper and lower portions of the valve chamber in communication, thus insuring pressure balancing of the upper and lower portions of the valve chamber. To insure maintenance of a predetermined maximum pressure differential across the sealing elements of the valve, thus preventing the development of a severe operator retarding force due to volumetric differentiation between the upper and lower portions of the valve chamber, a fluid compensating conduit or circuit is provided that interconnects the upper or large volume portion of the valve chamber with one of the flow passages of the valve. This circuit incorporates a valving and fluid metering arrangement automatically allowing fluid interchange between the valve chamber and flow passage of the valve in the event volumetric fluid differentiation should increase or ecrease fluid pressures within the valve chamber beyond a predetermined acceptable pressure range. For example, the valving and metering arrangement might be set to maintain a positive or negative pressure differentiation of 25 p.s.i. between the valve chamber and flow passage with the plug member of the valve during seating and unseating movement.

Also incorporated into the valve mechanism is a dampening system that provides cushioning capability to prevent slamming of the plug member as it reaches the end of its rotary travel during operation. The dampening system may incorporate a dampening housing defined either externally or internally of the valve body structure and the dampening chamber may be filled with a dampening medium, such as hydraulic oil, for example. A vane element may be positioned within the dampening housing in such manner as to divide the dampening housing into first and second dampening chambers. A dampening passage system may be provided having one extremity thereof in communication with one of the dampening chambers and with the opposite extremity in communication with the opposite dampening chamber. The vane element, which may be connected to the valve stem or trunnion, depending upon the character of the dampening system utilized, will be rotated within the dampening housing and will cause dampening fluid to be forced from one of the dampening chambers to the opposite dampening chamber. A relief valve system may be incorporated into the dampening conduit system so as to provide a restriction to the free flow of fluid between the dampening chambers. This restriction to fluid flow will provide an opposing force that is transmitted to the plug element, opposing free rotation of the plug element. As the plug element reaches the end of its operational stroke or rotary moement, any tendency of the plug member to slam or apply severe inertia induced loading to the valve actuator mechanism will be minimized. For the purpose of achieving dampening regardless of the direction of fluid flow through the dampening passage system, a pair of conduits may be connected in schematically parallel relation with each conduit incorporating a relief valve capable of allowing unidirectional restricted fluid flow. The plural opposing relief valves may be incorporated in a single relief valve structure and may be simply connected into a single dampening passage interconnecting the dampening chambers.

BRIEF DESCRIPTION OF THE DRAWINGS

For a better understanding of the invention, as well as other objects and further features thereof, reference is made to the following detailed description to be read in conjunction with the accompanying drawings, wherein:

FIG. 6 is a fragmentary sectional view of the valve mechanism of FIG. 4 illustrating the plug member thereof in its raised or unseated position and further illustrating mechanical structure for retaining the sealing elements of the plug member in positive mechanically retained relationship relative to the structure of the plug valve.

FIG. 7 is a fragmentary vertical section of the plug structure illustrating further details of mechanical apparatus for retaining the sealing element in mechanically interlocked relationship with the plug structure and showing a pressure equalizing passage being formed in the vane portion of the plug member.

FIG. 8 is a fragmentary sectional view illustrating the seal and seal retainer structure in detail.

FIG. 9 is a partial elevational view of the plug structure of FIGS. 4 and 6, illustrating further details of the seal retainer structure.

FIG. 10 is a fragmentary sectional view taken along lines 10—10 of FIG. 9 and illustrating further mechanical details of the apparatus for retaining the sealing elements in interlocked relationship with the plug structure.

DETAILED DESCRIPTION OF PREFERRED EMBODIMENT

Figure 1:
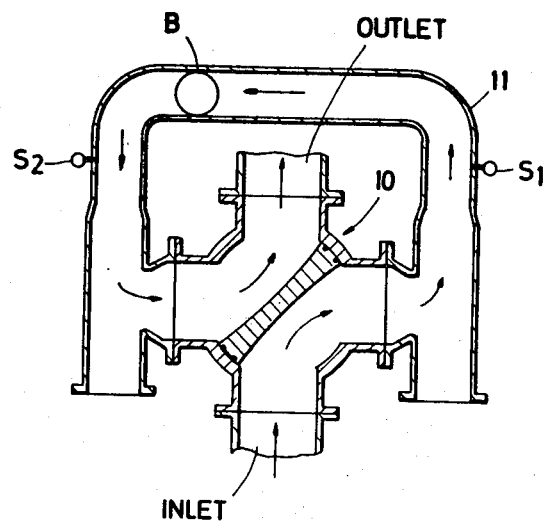
FIG. 1 is a diagrammatic representation in plan, illustrating a bidirectional meter prover loop system incorporating a four-way diverter valve for controlling operation thereof and further showing counterclockwise flow through the meter prover loop.
Figure 2:
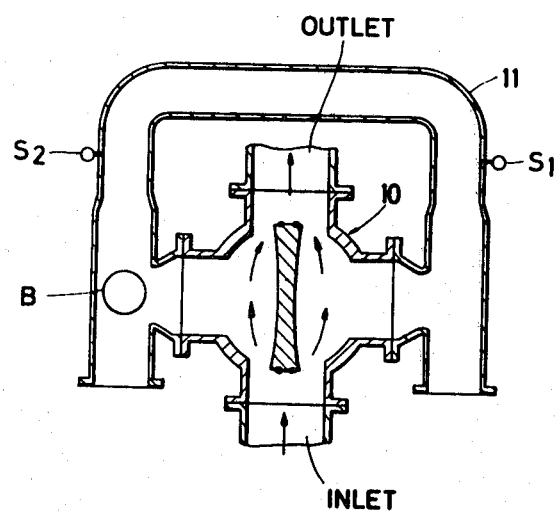
FIG. 2 is a diagrammatic representation as in FIG. 1, illustrating the valve element at an intermediate position during movement between the operative positions of FIGS. 1 and 3. In such position fluid by-passes the meter prover loop and flows directly between the inlet and outlet passages.
Figure 3:
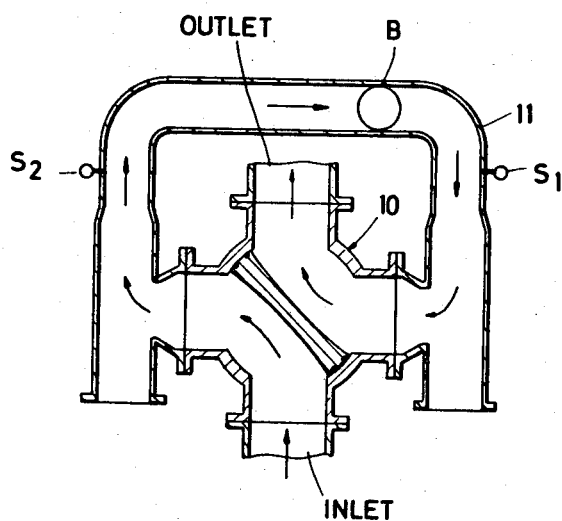
FIG. 3 is a diagrammatic representation as in FIGS. 1 and 2 illustrating the four-way diverter valve as being positioned to cause clockwise flow through the meter prover loop.

Referring now to the drawings and first to FIGS. 1-3, there is shown a four-way valve mechanism generally at 10 that is interconnected with a bidirectional meter prover loop 11. The valve 10 is positionable to control the flow of fluid from inlet and outlet conduits and achieve reversible flow within the flowmeter loop. In FIG. 1, the valve mechanism is positioned to direct the flow of fluid from the inlet through the meter prover loop in a counterclockwise direction. The fluid measurement occurs as ball B causes initiation of the measuring run at switch $S_1$ and terminates the measuring run upon subsequent actuation of switch $S_2$. In FIG. 2, the valve mechanism is shown at an intermediate position during movement between the operative positions of FIGS. 1 and 3. In this intermediate condition fluid flow from the inlet passage flows directly to the outlet passage without directing a flow condition through the meter prover loop. At this stage of valve movement, the moving fluid within the loop begins to slow its flow for reversal when the valve movement is completed. In FIG. 3, the valve mechanism is positioned to reverse the flow of fluid through the meter prover loop, thus achieving clockwise flow. In this case, the prover run is initiated as the ball B actuates the switch $S_2$ and the measurement terminates as switch $S_1$ is tripped by passage of the ball. The volume of the prover loop between switches $S_1$ and $S_2$ is known and the flow rate is determined by the lapse of time between actuation of switches $S_1$ and $S_2$. Of course, when the fluid is a gas, other factors must be considered in order to establish accurate measurement. Moreover, positive sealing of the valve mechanism is required for the accuracy of flow measurement for the reason that any leakage of the valve would cause inaccurate measurement of the flow rate.

Figure 4:
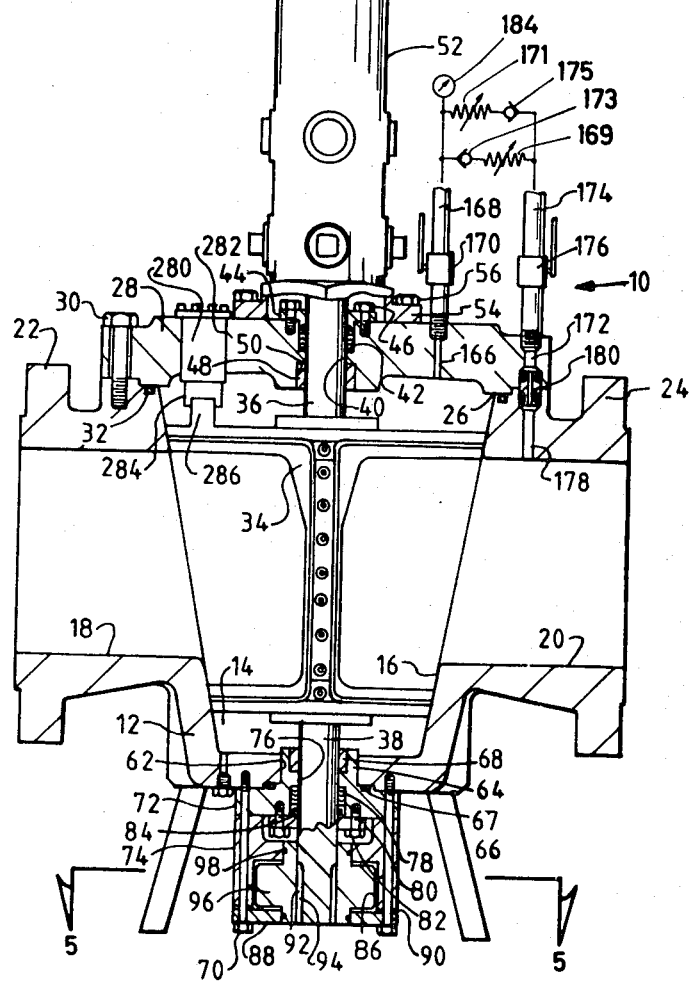
FIG. 4 is an elevational view of a valve and actuator assembly constructed in accordance with the principles of the present invention with the valve structure being broken away and shown in section and with the valve element shown seated and at an intermediate position to facilitate a ready understanding of the valve construction.

Referring now to FIG. 4, the four-way lift turn type plug valve is illustrated generally at 10 and includes a valve body structure 12 defining a valve chamber 14 of frusto-conical configuration and defining a frusto-conical sealing surface 16. The valve body structure also defines four inlet and outlet passageways, two of which are illustrated at 18 and 20, and further provides connection flanges, such as shown at 22 and 24, or other suitable connection means for establishing connection between the valve mechanism and a flow conduit system. The valve body structure is formed to define an upper opening 26 that is closed by means of a bonnet structure 28 that is retained in assembly with the body structure by means of a plurality of bolts 30 that extend through appropriate apertures formed in the bonnet and are received within threaded apertures formed in the valve body structure about the opening 26. An annular sealing element 32, such as an O-ring, or the like, is retained within an annular groove formed at the upper extremity of the valve body to provide a positive fluid tight seal between the valve body and bonnet structure.

Within the valve chamber 14 is movably positioned a plug element 34 that is of generally tapered or frusto-conical configuration and which is adapted for mating engagement with the frusto-conical sealing surface 16 defined by the valve body. The plug member 34 is supported for rotation within the valve body 12 by a valve stem 36 and a trunnion 38 that extend in nonrotatable relation from opposed extremities of the plug element. The bonnet structure 28 is formed to define a stem passage 40 through which the valve stem 36 extends. A sealed relationship between the valve stem and the bonnet is maintained by a packing assembly 42 that is retained within a packing chamber defined immediately above a restricted portion of the valve stem passage 40. A packing gland or retainer 44 may be secured to the bonnet structure 28 by bolts 46 for the purpose of retaining the packing assembly 42 within the packing chamber. A bearing element 48 is positioned about the valve stem 36 and is received within a bearing receptacle 50 defined within the bonnet structure. The bearing 48 provides bearing support for the valve stem 36 and may be formed of any suitable bearing material that is compatible with the material of the valve stem.

Figure 11:
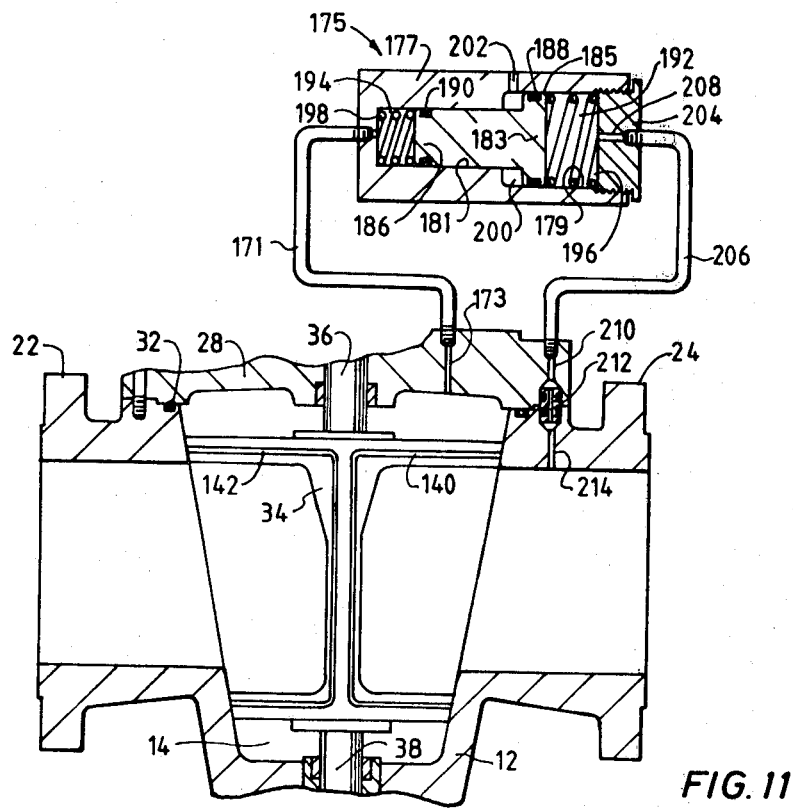
FIG. 11 is a partial sectional view of a four-way valve mechanism constructed according to the present invention and incorporating a pressure responsive pressure multiplying system for insuring maintenance of a positive pressure in the valve chamber to enhance the seating ability of the valve element.
Figure 12:
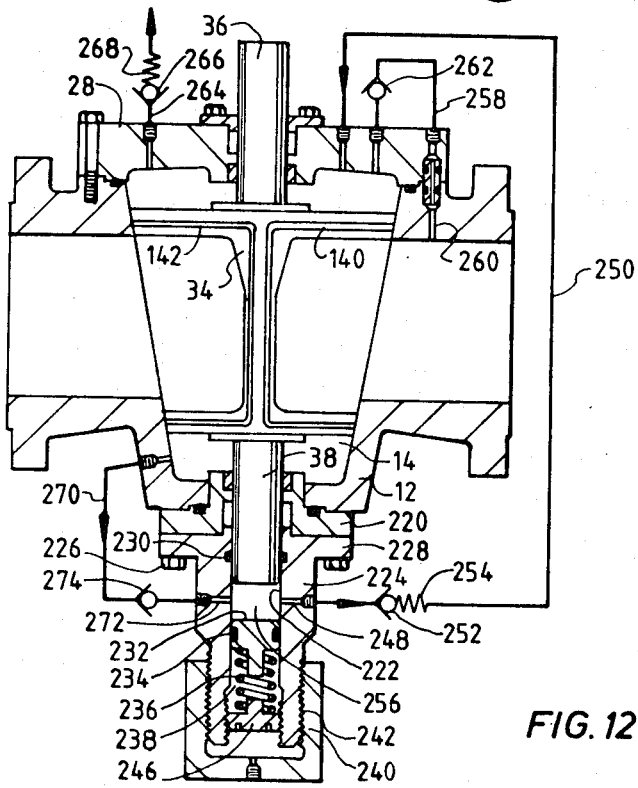
FIG. 12 is a sectional view of a four-way valve mechanism constructed according to this invention and incorporating a system for achieving automatic body venting and positive pressure seating to enhance the sealing ability of the valve element.

To facilitate ready understanding of the structure of the valve construction, the valve element 34 is shown in FIGS. 4, 11 and 12 at an intermediate position such as in FIG. 2 and is shown seated. In operation, the true intermediate and unseated relation of the plug is shown in FIG. 6, and in FIGS. 1 and 3.

In order to operate the plug member 34 within the valve body, the valve mechanism may be provided with a valve actuator illustrated generally at 52 having a base connector flange 54 that may be secured to the bonnet structure 28 of the valve by means of a plurality of bolts 56. The valve actuator mechanism will typically be powered and is provided with a motor connector flange 58 from which extends a connector shaft 60 of the valve actuator. A reversible electric motor may be secured to the flange 58 by means of bolts, or any other suitable means of connection, and a nonrotatable connection may be established between the actuator shaft 60 and the motor shaft, not shown, in order that the motor may impart rotary movement to the shaft 60 and thus achieve power operation of the valve actuator. Any one of a number of suitable types of valve actuators may be employed within the spirit and scope of the present invention, it being only necessary that the valve actuator mechanism be capable of imparting both linear and rotary movement to the valve stem 36 for unseating, rotating and reseating the plug member 34 with respect to the sealing surfaces defined within the valve body. For operation of the valve as illustrated in FIG. 4, the actuator mechanism first moves the valve stem 36 linearly in an upward direction sufficiently to separate the sealing element of the plug from the sealing surfaces of the valve. After this has been accomplished, the plug member will be rotated by the valve actuator to a preselected position within the valve chamber. After this has been accomplished, the valve actuator will move the valve stem linearly in a downward direction so as to cause the tapered plug member to again be reseated in sealing engagement with respect to the seating surfaces defined within the valve chamber.

As mentioned above, the plug element of large valve will be quite massive and will develop considerable inertia forces as it is stopped at its preselected position by the valve actuator. It is desirable to provide a dampening system that prevents free rotation of the plug member and which provides dampening forces that oppose the inertial forces of the plug member. This feature will prevent a condition referred to as slamming which, as explained above, can cause serious damage and excessive wear to the valve actuator mechanism. In accordance with the present invention and as illustrated at the lower portion of FIG. 4 and in FIG. 5, one suitable means for inducing dampening forces to the rotating plug member may be accomplished as follows. At the lower portion of the valve body 12 an aperture 62 may be formed within which may be received the extension portion 64 of a packing and bearing insert 66. A bearing 68 which may be similar to the bearing 48 described above may be received within a bearing receptacle defined in the extension portion 64 of the insert 66. The bearing 68 will provide an appropriate bearing journal for the trunnion element 38 thereby preventing excessive wear of the trunnion or valve body responsive to rotation of the trunnion during valve operation. The packing and bearing insert 66 may be retained in assembly with the valve body 12 by means of bolts 70 that extend through a flange portion 72 of the insert. Bolts 70 also extend through elongated bolt passages formed in a dampener housing 74. The packing and bearing insert defines a trunnion passage 76 through which the trunnion 38 extends. A portion of the trunnion passage may be defined by a packing chamber within which may be received a packing assembly 78 that establishes a fluid tight seal between the packing and bearing insert and the trunnion 38. A packing retainer element or packing gland 80 may be secured to the packing and bearing insert 66 by means of a plurality of bolts 82 for the purpose of retaining the packing assembly 78 in position within the packing chamber. The packing gland incorporates an internal seal element 84 that establishes a seal between the packing gland and the trunnion 38 outwardly of the packing assembly 78.

The dampening housing 74 is formed internally to define an internal receptacle 86 that is closed by means of a partial cover plate or bonnet 88 secured to the dampening housing by means of the bolts 70. A sealing element 90 is interposed between the cover plate and the dampening housing in order to provide an appropriate seal for the dampening chamber 86. The lower extremity of the trunnion element 38 may be formed to define external splines 92 that are received in splined connection with an internal splined receptacle 94 formed in a vane element 96 that is positioned within the dampening chamber 86. A lower circular portion of the vane element is positioned within a central aperture defined by the partial cover plate. Internal seal element 98, such as O-rings or the like, may be retained within annular seal grooves formed in opposed cylindrical portions of the vane element for the purpose of establishing a seal between the dampening housing and the upper portion of the vane element 38 and between the partial bonnet 88 and the lower portion of the vane element. The splined connection between the trunnion and the vane element establishes a nonrotatable relationship therebetween but allows the trunnion element to move linearly as is necessitated by linear movement of the valve stem and plug element to accommodate the unseating and reseating movements described above. The lower extremity of the trunnion 38 is exposed to the atmosphere.

Figure 5:
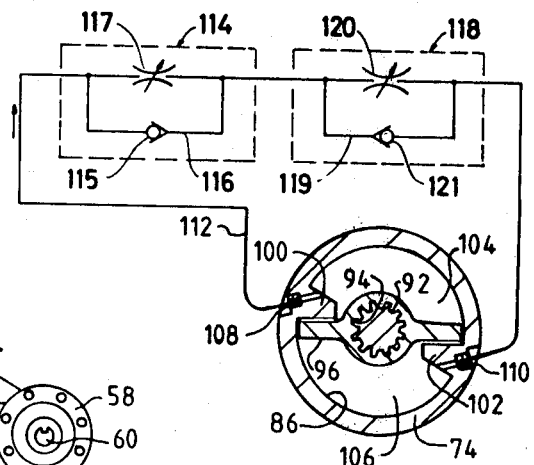
FIG. 5 is a sectional view taken along lines 5—5 of FIG. 4 and illustrating the dampening system of the valve mechanism in section with the dampening fluid transfer system thereof shown schematically.

With reference now to FIG. 5, which is a transverse section taken along line 5—5 of FIG. 4, the dampening housing 74 may be formed to define internal projecting portions 100 and 102 that define limits of rotational travel of the vane element 96 within the dampening housing. The vane element cooperates with the housing structure and with the internal projections 100 and 102 to define first and second dampening chambers 104 and 106. As shown schematically in FIG. 5, a dampening interchange passage or conduit system is illustrated, having its extremities 108 and 110 interconnected with the housing structure 74 and in communication with respective ones of the dampening chambers 104 and 106. The dampening fluid interchange system, as shown in FIG. 5, incorporates a conduit or passage 112 having a flow controller shown generally at 114 interconnected therein which allows unrestricted fluid flow through the conduit 112 in one direction while restricting flow in the opposite direction. A check valve 115 is connected into a bypass conduit 116 that is, in turn, connected across a variable restrictor valve 117. With the check valve 115 seated and preventing flow through the by-pass conduit 116, flow across the restrictor valve is retarded. A second flow controller, illustrated generally at 118 by the broken line, is also interconnected into conduit 112 and functions in the same manner as controller 114. Controller 118 includes a bypass line 119 connected across a variable restrictor valve 120 with a check valve 121 allowing free flow of fluid through the bypass line in one direction. Check valves 115 and 121 are oppositely oriented in the respective bypass lines, causing fluid flow to be directed across one of the variable restrictor valves in each direction of flow. For example, flow in the direction of the flow arrow is blocked by check valve 115 and thus flows across the restrictor valve 117. Such flow then passes freely through the flow controller because of the orientation of check valve 121. Thus, flow in the direction of the flow arrow is restricted by the restrictor valve 117 and the degree of restriction can be controlled to insure proper counterclockwise movement of the vane 96. For separate control of the clockwise movement of the vane element, to develop a differing dampening effect as compared with counterclockwise dampening, flow in the opposite direction through the conduit 112 is restricted only by restrictor valve 120. Flow through the bypass line 119 is blocked by check valve 121 but check valve 115 allows free flow through bypass line 116.

As the valve actuator 52 imparts rotary movement to the valve stem 36, the plug 34 and the trunnion element 38, the trunnion, with its splined connection with the vane element 96, causes the vane element to rotate within the dampening housing 74. Assuming the second dampening chamber 106 to be filled with a dampening fluid, such as hydraulic fluid, for example, counterclockwise movement of the vane element will cause dampening fluid to be ejected from one of the dampening chambers 104 and 106, whereupon the dampening fluid will flow through the flow controllers being restricted due to the particular setting of the variable restrictor valve 117 or 120. The fluid will then flow into the opposite one of the dampening chambers 104 and 106 to fill the void that is created by movement of the vane element. Upon movement of the vane element in the opposite direction, which is caused by rotation of the valve stem plug and trunnion in the opposite direction, dampening fluid within the opposite one of the dampening chambers 104 and 106 will be displaced through the dampening conduit and across the opposite one of the flow controllers 114 and 118 before entering the opposite one of the dampening chambers.

As the dampening fluid flows through the flow controllers one of the restrictor valves will offer a preset amount of resistance to the free flow of fluid. This resistance will manifest itself in imparting a retarding force or resistance to the trunnion, and thus to the rotating plug and valve stem, which retarding force opposes the rotational movement induced by the valve actuator. This opposing force will prevent the plug member from slamming and developing an excessively large and damaging force on the valve actuator as the valve actuator abruptly stops the plug element at its preset position. In fact, the opposing dampening force will assist the valve actuator in stopping the plug member at the preset position.

One of the more important aspects of controlling flow of fluid with four-way type plug valves is the tendency of the valves to "windmill" during fluid diverting movement. As the valve is operated, during an initial portion of valve movement the force of the valve actuator is impeded by fluid force acting on the vane or valve element. As valve movement continues, the force induced by fluid pressure changes suddenly from opposing movement of the valve element to enhancing continuing movement of the valve element. This sudden force change due to windmilling can result in severe mechanical shock to the valve and actuator mechanism. Moreover, the windmilling valve element can also cause sudden and severe alteration of the flow characteristics through the valve. The flow controllers will also function cooperatively to dampen and resist the windmilling effect that is prevalent in four-way plug valves.

As shown in FIG. 6, the plug member 34 is lifted to the unseated position thereof and the sealing elements of the plug member are readily visible. It is desired that the plug member be provided with easily replaceable sealing elements in order that the valve mechanism may be repaired in the field should the sealing elements become worn or damaged during use. It is also desirable that the plug member be such that manufacture will be relatively simple and inexpensive. As shown in FIG. 4 and in more detail in FIGS. 6, 7 and 8, the upper and lower portions of the plug member will be turned as by lathe operations to define annular end recesses such as shown at 124 and 126 in FIG. 7. Upper and lower annular retainer rings 128 and 130 may be secured to the plug element by a number of bolts 132 and 134 that extend through apertures formed in each of the retainer elements. The retainer elements cooperate with the plug structure to define an annular seal groove 136 within which may be received a semi-annular portion of one of the sealing elements 138 and 140.

Each of the sealing elements is integrally formed and, as shown in FIG. 6, the sealing elements are formed to define upper and lower generally semicircular portions 142 and 144, respectively, that are joined by means of intermediate sections 146. The intermediate sections are of substantially straight configuration and are formed to follow the taper defined by the tapered side walls of the plug. As shown in FIG. 10, the straight portions 146 of the seal members are received within elongated grooves 148 and 150 that are established by cooperative relationship between a retainer element 152 and the structural wall portion 154 of rotatable plug member 34. The elongated retainer element, as shown in FIGS. 9 and 10, is secured to the plug structure by means of a plurality of bolts 156. As shown in the cross-sectional view of FIG. 10, the seal grooves 148 and 150 are of L-shaped configuration that mate with the L-shaped configuration of the sealing elements. The base portions of the sealing elements are retained in position retainer elements. Likewise, as seen in FIG. 8, the L-shaped sealing element 138 is also entrapped within the corresponding L-shaped seal groove 136 by an internal shoulder defined by the retainer ring 128.

To provide ease of manufacture of the retainer elements 152, the retainer element is shown in FIG. 9 as terminating short of the upper and lower portions of the sealing elements. Upper and lower retainer fillet elements 158 and 160 are secured to the plug structure by means of bolts 162 and 164 and function to provide curved transition from the straight groove portions 148 and 150 to the semicircular upper and lower portions of the seal grooves as shown at 136 in FIG. 8. At each portion of the plug structure the sealing elements are of basically L-shaped cross-sectional configuration and are retained in mechanically interlocked relation with the plug structure by means of the various retainer elements. By providing for retention of the sealing elements in this manner, the sealing elements will resist any tendency to be extruded or pulled from the respective grooves under the influence of pressure or velocity induced forces caused by the fluid flowing through the valve.

In the event the sealing elements should become worn or damaged to the extent that replacement is necessary, the retainer elements may be separated from the plug structure and the sealing elements may be very simply removed. After replacement of the sealing elements, the retainer elements may again be bolted in place as shown in FIGS. 7-10.

As the plug member moves downwardly from the lifted position of FIG. 6 to the fully seated position of FIG. 4, an initial seal will be developed as the sealing elements initially contact the sealing surfaces of the valve body. At this time, pressure within the valve chamber will substantially equal the pressure within the flow passages. As the plug member is then moved further downwardly to its fully seated position, pressure within the smaller or lower portion of the valve chamber tends to increase as the fluid therein is compressed. Simultaneously, pressure within the larger or upper portion of the valve chamber tends to decrease below line pressure due to the vacuum forming effect created by downward movement of the plug member. Obviously, operation of the valve actuator is retarded as the plug member is moved into fully seated relationship within the valve body due to development of such positive and negative pressures.

The valve actuator can move the plug, but with some difficulty. When the fluid is a liquid or other substantially incompressible medium, a condition of hydraulic lock can develop which can prevent or severely retard movement of the plug. In accordance with this invention, and as shown in FIG. 7, the partition portion 34 of the plug member may be formed to define an equalizing passage 147 that allows free interchange of fluid between the chambers above and below the plug member, thereby maintaining equalized pressure within these chambers. In large sized valves several quarts of fluid will flow through the equalizing passage 147 with pressure in the upper and lower chambers remaining substantially balanced.

Due to the tapered nature of the plug member, the surface area of the upper portion of the plug greatly exceeds the surface area of the lower portion thereof. After initial sealing contact has been established, continued seating movement of the plug member tends to develop positive and negative valve chamber pressures as discussed hereinbelow. The equalizing passage 147, however, allows the development of a balanced pressure condition within the valve chamber, but this balanced pressure will nevertheless be lower than line pressure. The much greater surface area of the large extremity of the plug member can result in the development of a severe negative pressure condition that can severely retard actuation of the valve by the valve actuator, resulting in undesirable wear of the valve actuator and requiring a much more expensive and higher rated valve actuator mechanism in order to accomplish satisfactory operation. Although maintenance of a pressure differential between line pressure and valve chamber pressure is advantageous for reasons identified hereinbelow, the present invention provides means for limiting the effect of the negative pressure that is established as the plug member of the valve is fully seated.

As illustrated in FIG. 4, the bonnet structure 28 is shown to be formed to define a passage 166 to which is threadedly connected a conduit 168 that may have a control valve 170 connected therein. The bonnet structure is also formed to define a passage 172 within which is connected a conduit 174 that may have a control valve 176 connected therein. The passage 172 of the bonnet structure is brought into registry with a passage 178 formed in the valve body and a bridge coupling 180 is utilized to provide sealed communication across the joint between the bonnet and valve body. The bridge connection 180 is internally bored to communicate fluid from passage 172 to the passage 178 of the valve body. Conduits 168 and 174 are bridged by a pair of parallel conduits shown schematically at 169 and 171, each having adjustable check valves 173 and 175, respectively. The fluid communication that is established between the valve chamber and flow passage by valved conduits 168 and 174 together with the valve body and bonnet passages and bridge conduits 169 and 171 may best be defined as a positive and negative pressure limiting system. The pressure limiting system has the effect of maintaining the pressure differential between the valve chamber and flow passage at predetermined values as established by respective ones of the variable check valves 173 and 175. The pressure limiting system also has the effect of bleeding fluid either to the flow passage or from the flow passage responsive to volumetric changes that occur within the valve body due to movement of the plug member. For example, when the plug member is shifted upwardly during unseating, the large area of the plug member displaces a substantial volume of fluid during the unseating operation. Some of the displaced fluid will flow through the pressure balancing passage 147 to the lower, smaller portion of the valve chamber, but, unless otherwise compensated for, the displaced fluid could develop an increased pressure within the valve chamber that is sufficient to stall or at least interfere with the valve actuator. Moreover, seating or unseating the plug member at high pressure differential across the sealing members of the valve can result in severe damage to the sealing members due to pressure extrusion, erosion and cutting of the sealing members. When the plug member is moved upwardly, pressure can increase only to the value determined by the pressure setting of check valve 173. As the plug member continues to be moved upwardly, the check valve 173 unseats and vents the excess fluid through conduit 174 and passages 172 and 178 into the flow passage 20. The pressure differential across the sealing members will not exceed the pressure setting of the check valve, such as 25 psig, for example.

As the plug member is moved downwardly toward the fully seated position thereof, initial sealing engagement will occur at some intermediate position. Thereafter, further downward movement of the plug member will result in the development of a negative pressure within the valve chamber again due to the substantially greater surface area at the large extremity of the plug member as compared with the smaller extremity thereof. If the setting of the check valve 175 is 25 psig, for example, as soon as the negative pressure within the valve chamber decreases to 25 psig, further volumetric fluid displacement resulting from further downward movement of the plug member will result in unseating of the check valve. Fluid from the flow passage 20 will enter the valve chamber through the pressure limiting system. The maximum pressure differential existing across the sealing elements of the valve at any time will be 25 psig in this situation. Of course, the variable check valves allow the positive and negative pressure differential ranges to be set at any desired value or set at differing values. Typical variable check valves for accomplishing pressure limiting may take the forms illustrated in FIGS. 14 and 15, discussed in detail hereinbelow. When four-way plug valves are utilized in meter prover systems, it is especially desirable to detect any leakage across the sealing elements. Any inaccurate flow measurement that occurs must be deleted in order to determine the accuracy of the flowmeter being tested.

In the valve construction of FIG. 4, with the valve element seated at one of the sealing and diverting positions thereof, there will exist a slight pressure differential across the valve element. Since the valve construction is a four-way diverter valve that is designed for use in meter prover systems and other systems where flow diversion is employed, the upstream and downstream sides of the valve chamber may be in fluid communication as shown in FIGS. 1 and 3. The spherical plug, however, has frictional engagement with the internal surfaces of the meter prover conduit and thus, must be moved within the conduit. The amount of pressure required to overcome the frictional engagement of the sphere, i.e. about 5 p.s.i., for example, will exist as a pressure differential across the valve element. It is necessary that the sealing elements of the tapered plug member 34 establish positive sealing at each sealing position thereof because any leakage, no matter how insignificant will result in an inaccurate meter prover measurement.

As the valve element is seated, a negative pressure will be developed within the valve chamber as compared to line pressure. If the sealing elements of the valve are sealing properly, the pressure differential between the line and valve chamber will be maintained. A pressure gauge 184 will monitor the pressure within the valve chamber 14. If the valve chamber pressure should be steadily increasing as indicated by the pressure guage, after the plug member has been seated, such pressure change would be evidence that the integrity of the seal is not properly established. The measurement taken must be disregarded in such event. Leakage may occur simply when sand, line scale or other debris might temporarily interfere with the sealing ability of the sealing element. As valve seating occurs, the pressure gauge should evidence pressure reduction within the valve chamber. Then the gauge pointer should remain stable until unseating movement is initiated. Control valves 170 and 176 may be closed to prevent the interchange of fluid between the valve chamber and flow passage, if it is desired to service the check valves or pressure gauge without shutting down the flow line or meter prover system controlled by the valve. More importantly, however, the valves 170 and 176 provide a means for isolating the check valves in order that they may be checked for leakage. By selectively operating the control valves 170 and 176 it can be determined whether leakage, if any, is occurring at the seals of the valve element or at the check valves.

In circumstances where a pressure limiting fluid interchange is not utilized and with fluid, especially a liquid, entrapped in the valve chamber above and below the plug member 34, a condition commonly referred to as hydraulic locking may occur. This condition may prevent or severely retard the ability of the valve actuator to impart upward movement to the plug member. In order to move upward, the plug member must displace a certain amount of the liquid or gaseous medium disposed in the valve chamber and above the plug. Since a liquid is substantially incompressible, the plug member may be prevented from displacing the liquid and moving upwardly unless the fluid is forced past the sealing members during seating and unseating movement. It desirable therefore to provide means for insuring an ability to displace a liquid or gaseous medium from upper and lower closed portions of the valve chamber structure, thus allowing the valve actuator to simply and efficiently operate the plug element between desired operating positions without encountering any severe opposing forces. One suitable means providing for displacement of liquid or gaseous medium from the closed space immediately above the rotatable plug element 34 may conveniently take the form illustrated in FIG. 11 where a pressure transmission conduit 171 is shown to be connected to the bonnet structure 28 in communication with a pressure transmission passage 173. A differential accumulator is illustrated generally at 175 and includes an accumulator body 177 that is formed internally to define large and small piston bores 179 and 181. A differential piston 183 is movably positioned within the housing 177 and defines large and small piston portions 185 and 186, respectively, having close fitting relation with the respective internal cylindrical surfaces 179 and 181 defining the piston bores. Annular sealing elements 188 and 190, such as O-rings or the like, are received within seal grooves formed in the respective piston portions of the differential piston 183 and establish sealed relationship between the respective piston portions and cylindrical surfaces. The differential piston cooperates with the housing structure 177 to define large and small spring chambers 192 and 194 containing compression springs 196 and 198, respectively, and also defines a vent chamber 200 that is communicated with the atmosphere by means fo a vent passage 202. A closure element 204 having an externally threaded portion is received within the outer threaded extremity of the larger bore 179 and provides a retaining function to retain the compression spring 196 within the chamber 192. A second pressure transmission conduit 206 may be connected to the closure element 204 in communication with a vent passage 208 defined in the closure element. The vent conduit may be connected at the opposite extremity thereof to the bonnet structure 28 in communication with a pressure transmission passage 210 that communicates across a bridge connector 212 with a vent passage 214 formed in the valve body.

When it is desired to impart upward movement to the plug element 34 within the valve chamber 14, an upward linear force is applied by the valve actuator to the valve stem 36. As the plug member begins upward movement, any fluid entrapped within the space between the bonnet and upper portion of the plug member will be displaced through passage 173 and conduit 171 to the differential accumulator 175. The differential accumulator piston 183 will then begin movement to the right under the influence of pressure within chamber 194, being assisted by the compression of spring 198 and being opposed by the compression of springs 196. Movement of the piston element 183 to the right will also be opposed by any pressure within chamber 192 which acts upon the larger surface area of piston portion 185. In other words, for the piston element 183 to move to the right under the influence of pressure transmitted from the valve chamber the pressure transmitted, together with the force of compression spring 198, must exceed the pressure and spring induced force developed at the larger end of the differential piston element. When the pressure of the vented fluid is sufficiently great to move the piston in this manner, any fluid contained in chamber 192 will be forced through conduit 206 and passages 210 and 214 into the flow passage of the valve.

The differential accumulator system will insure that the pressure contained within the valve chamber above the piston element 34 will exceed the pressure within the flow passage of the valve, thus placing the plug member 34 under positive pressure sealing. A pressure induced force will be developed on the plug member that will urge the plug member downwardly, thus causing the sealing elements 140 and 142 to be mechanically induced into tighter sealing engagement with the seating surface of the valve body. Should pressure within the space between the plug member and the bonnet be lower than line pressure, line pressure acting through conduit 206 and introduced into chamber 192 will urge the differential piston element 183 against the compression of spring 198. By virtue of the smaller surface area of smaller piston portion 186, the differential piston will develop a higher pressure in chamber 194 which will be communicated through the vent conduit 171 and vent passage 173 into the valve chamber. This higher pressure will act upon the plug member, positively urging the plug member downwardly into pressure enhanced sealing engagement with the seating surfaces defined within the valve chamber. Positive pressure sealing is thus effectuated and to enhance the sealing ability of the valve and venting of body fluid is also allowed in order to promote ease of valve actuation.

Referring now to FIG. 12, valve body venting and positive pressure sealing is shown to be promoted by an alternative valve mechanism including a substantially identical basic valve construction as in FIGS. 4, 6 and 11 but incorporating different external components and fluid circuitry for accomplishment of the same. The valve element will not be provided with passages, such as at 147 in FIG. 7, because pressure balancing within the upper and lower portions of the valve chamber is not desirable. As shown in FIG. 12, the trunnion element 38 is shown to extend through a packing and bearing retainer element 220 and into an internal bore 222 defined within an accumulator housing 224 that is secured to the valve body structure by a plurality of bolts 226 which extend through a flange 228 of housing 224 and are received within appropriate internally threaded apertures defined within the valve body 12. An annular sealing element 230 is received within an internal annular groove defined within the housing 224 and establishes sealing engagement between the housing and the trunnion element 38. Within the housing structure 224 is movably positioned a piston element 232 which is maintained in sealing engagement with respect to the housing structure by means of an annular sealing element 234 that is retained within an appropriate seal groove defined internally of the housing structure. The piston element 232 is urged toward the trunnion 38 by means of an adjustable compression spring 236 that is located within a spring chamber 238 defined within the housing. A spring adjustment cap 240 is internally threaded and is received by external threads 242 defined by the housing 224. A spring retainer element 246 that is received by an internally threaded portion of the bore 222 may be adjusted relative to the housing structure in order to achieve adjustment of the force induced to the piston element 232 by the compression spring 236.

The accumulator housing 224 may be formed to define a first fluid interchange passage 248 to which may be interconnected a fluid interchange conduit 250 incorporating an adjustable control check valve 252 that may be set by an adjustment mechanism 254 to allow flow of fluid from the accumulator chamber 256 when fluid pressure within the accumulator chamber exceeds the pressure setting of the control check 252. The opposite extremity of the fluid interchange conduit 250 may be connected to the bonnet structure 28 for communication of fluid into the space between the plug and bonnet structure. Another conduit 258 may be connected to the bonnet structure and may be communicated at one extremity with the space between the bonnet and plug and at the opposite extremity may communicate with a passage 260 that opens into a fluid passage of the valve. A check valve 262 may be incorporated into conduit 258 for the purpose of allowing unidirectional flow of fluid from the flow passage of the valve into the space between the bonnet and plug.

A fluid pressure control conduit 264 may also be connected to the bonnet structure 28 for communication with the space between the bonnet and plug. A control check valve 266 may be connected into the conduit 264 and may be controlled by means of a pressure adjustment mechanism 268 when it is desired to lift the plug member 34 preliminary to a rotational operation control check valve 252 and check valve 262 will not allow displacement of fluid from the space between the bonnet and plug. Consequently, control check valve 266, the control pressure of which may be set at line pressure "P" plus the positive pressure induced by the accumulator, which is referred to as "Delta P," will allow displacement of flujid through the conduit 264.

To facilitate displacement of fluid from the chamber between the valve body and the lower portion of the plug member, a vent conduit 270 will be connected to the valve body, as schematically shown in FIG. 12. The opposite extremity of the conduit 270 will be connected to the accumulator housing 224 in communication with a passage 272 communicating with the accumulator chamber 256. A check valve 274 may be connected into the conduit 270 and will be operative to allow fluid within the chamber 14 below the plug element to be displaced into the accumulator chamber. The fluid so displaced will act upon the piston element 232 forcing the piston element downwardly against the compression of the spring 236.

The compression of spring 236 will be adjusted so as to develop a force acting upon piston 232 that develops a fluid pressure within the accumulator chamber that is substantially equal to line pressure "P" plus accumulator pressure, "Delta P." The control check valve 252 will also be adjusted to allow the flow of fluid in fluid interchange conduit 250 when the pressure in the accumulator chamber substantially equals line pressure plus accumulator pressure. As the plug element 34 is moved downwardly by the valve actuator, after initial seal contact has been established further downward movement will displace fluid from the space betweent the plug and the body structure through conduit 270 and check valve 274 into the accumulator chamber. After the plug seal has been established, continued downward movement of the plug element will develop a reduced pressure condition within the space between the bonnet and the upper portion of the valve body. Fluid from the accumulator chamber will therefore flow through the control check valve 252 and conduit 250 and will enter the space between the bonnet and the upper portion of the plug element.

As the plug member is moved downwardly by the valve actuator, the trunnion element 38 will move downwardly within the piston bore 222 thereby forcing the piston member 232 downwardly against the compression of spring 236. As mentioned above, the spring 236 is set at P+Delta P. The control check valve 252 will therefore bleed fluid into the valve chamber. When the plug member is seated, fluid in the accumulator chamber will bleed through fluid interchange conduit 250 into the space between the bonnet structure and the upper portion of the plug member. Thus, within the valve chamber 14 there will be maintained a pressure condition of P+Delta P and this positive pressure condition will develop a force acting upon the plug member that urges the plug member into mechanically greater sealing engagement with the valve body structure.

Figure 13:
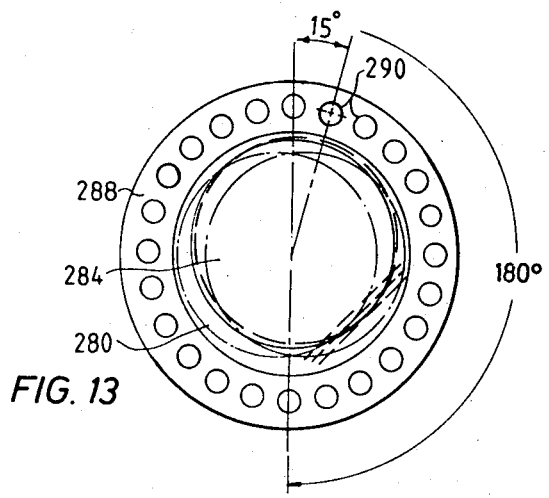
FIG. 13 is a diagrammatic representation of a plug position adjustment mechanism illustrating the allowable limits of plug positioning that is available upon 180° adjustment of the positioning mechanism.

Referring now again to FIG. 4 and also to FIG. 13, it is desirable to provide means for properly positioning the plug element with respect to the valve body structure to insure optimum sealing engagement, especially between the straight sealing portions of the plug member and the seating surfaces 16 of the valve body. In accordance with the present invention, an adjustment member 280 may be provided that is received within an opening 282 defined in the bonnet structure 28. An eccentric portion 284 of the adjustment element 280 extends into the valve chamber 14 and is positioned for engagement by a stop element 286 defined at the upper portion of the plug element 34. During valve operation, the plug element is rotated by the valve actuator 52 until the stop element 286 engages the cam portion 284 of the adjustment element 280. At this time proper positioning of the plug element has occurred and the valve actuator will shift the plug member 34 downwardly into sealing engagement with the valve body.

As shown in FIG. 13, the positioning element 280 will be provided with a flange portion 288 having a plurality of apertures 290 formed therein. As shown, the apertures are positioned on 15° centers and may be brought into registry with internally threaded apertures formed in the bonnet structure. If it is desired to adjust the stopping position of the plug element 34, adjustment element 280 may be unbolted from the bonnet and may be rotated one or more apertures relative to the bonnet and may again be secured in place by the bolts. As shown diagrammatically by means of broken lines in FIG. 13, an 180° adjustment of element 280 will adjust the position of contact between the cam 284 and the stop element 286 by the amount shown by opposed arrows. If any wear occurs that requires slight shifting of the adjustment element, it is not necessary to disassemble the valve in order to achieve proper stopping position of the plug. By simply unbolting the adjustment element, rotating it a desired number of aperture increments and rebolting it is place, plug positioning adjustment can be accomplished. This adjustment operation can be accomplished in a few minutes time using simple wrenches and tools. Moreover, it is not necessary to shut down the valve controlled flow system for extended periods of time merely to achieve adjustment of plug stopping position. Also, it is not necessary to provide for position adjustment by means of adjusting the internal operational mechanism of the valve actuator. The valve actuator can therefore be of relatively simple and inexpensive design without detracting in any way from the commercial feasibility of the present invention.

As mentioned above, it is desirable to provide means for achieving fluid interchange between the valve chamber 14 and flow passages 20 to allow compensation for volumetric changes as the plug member is seated and unseated. As shown in FIG. 4, a pair of conduits 168 and 174 are interconnected by variable check valves 173 and 175 and allow fluid interchange to occur while maintaining pressure differential between the valve chamber and flow passage within predetermined limits. Simplification of the fluid conduit and valve system illustrated schematically in FIG. 4 may conveniently take the form of double relief valve mechanisms illustrated particularly in FIGS. 14 and 15.

Figure 14:
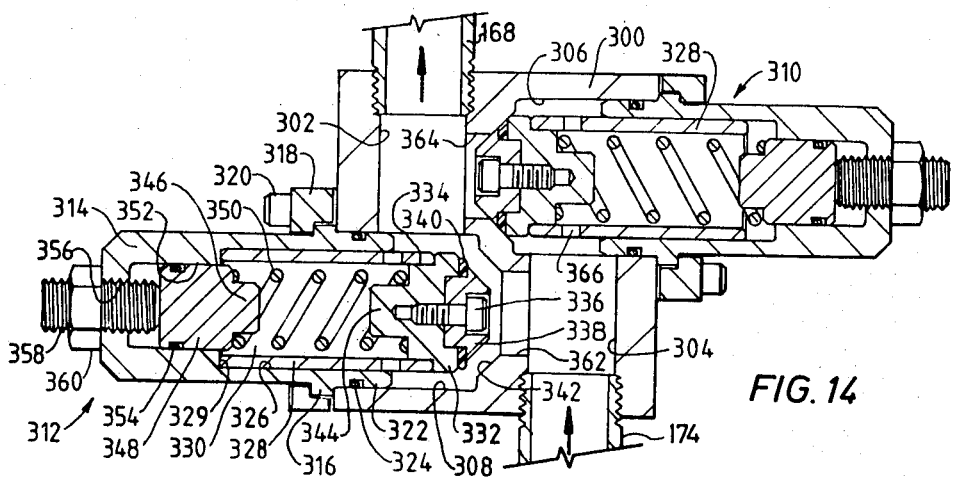
FIG. 14 is a sectional view of a restrictor valve mechanism that is adapted to control communication between the valve chamber and flow passage of the valve and insure maintenance of a predetermined pressure differential range between the valve chamber and flow passage.
Figure 15:
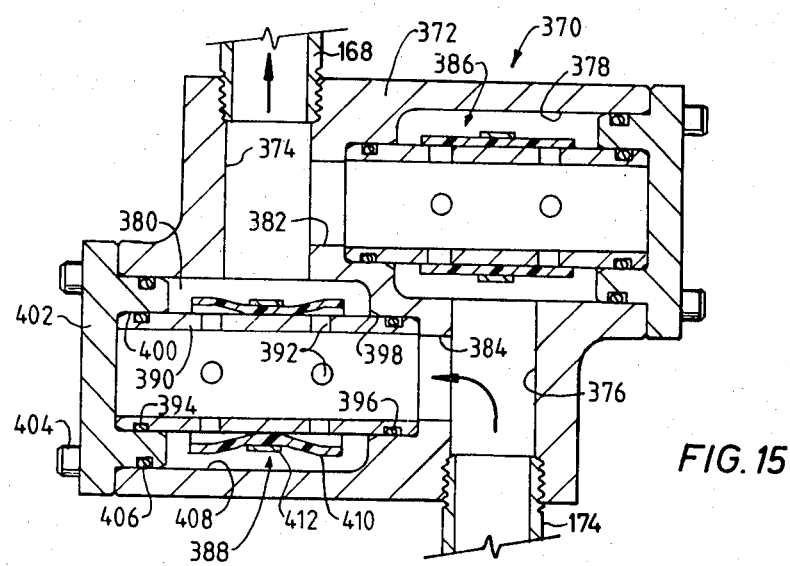
FIG. 15 is a sectional view of a restrictor valve representing a modified embodiment of the present invention and utilizing sleeve type valve elements for controlling the direction of fluid flow through the restrictor valve mechanism and establishing the selected pressure differential range.

As shown in FIG. 14, a fluid interchange conduit may be provided having conduit section 168 and 174 having the opposite extremities of these conduit sections in communication with the valve chamber and flow passage, respectively, as shown in FIG. 4. As the valve element 34 is seated and unseated, a high volume flow is induced in lines 168 and 174. A check to control such flow must operate at low pressure differential, must allow high volume flow and must develop a positive seal. A double relief valve mechanism is shown in FIGS. 14 and 15 which effectively provides these features. Each valve portion of this valve construction allows unidirectional flow of fluid within individually preset pressure ranges. The double relief valve mechanism incorporates a valve body structure 300 that is formed to define inlet and outlet passageways 302 and 304 that are intersected by valve chambers 306 and 308, respectively. Within the valve chambers are received relief valve mechanisms illustrated generally at 310 and 312. The relief valves are of essentially identical configuration and, for purposes of simplicity, only one of the relief valves 312 will be discussed in detail.

Relief valve 312 includes a housing structure 314 defining an annular external flange 316 that is received by a retainer element 318 by which the housing structure may be secured to the body structure 300 by means of bolts 320. An internal portion 322 of the housing 312 is received within the bore 308 and is sealed with respect to the bore by means of an annular sealing element 324 which may conveniently take the form of an O-ring, or any other suitable sealing element, received within an annular seal groove formed in the housing 314.

The housing 314 is formed internally to define a bore 326 within which is received a sleeve type plunger 328 defining a spring receptacle 330. At one extremity of the sleeve element 328 may be provided a seal support element 332 defining a cylindrical surface 334 that is receivable in press fitted immovable position at the outer extremity of the sleeve. The support element is also formed to receive a bolt or screw element 336 by which a seal retainer element 338 may be secured to the support element in such manner as to retain an annular sealing element 340 in positively retained relation with the plunger. Within the valve body structure 300 at the inner extremity of the bore 308 is formed a frusto-conical seat surface 342 that is engageable by the seal element 340 when the plunger element is seated in the manner shown by the relief valve mechanism 310. The support element 322 is also formed to define a projecting guide portion 344 which cooperates with a guide portion 346 defined on a springs adjustment element 348 to support a compression spring 350 within the springs receptacle 330. An adjustment element 348 is movably received within a reduced diameter bore 352 formed in the housing 314 and is maintained in sealed relationship with respect to the housing 314 by an annular sealing element 354, such as an O-ring or the like, that is received within a seal groove formed in the springs adjustment element. The outer portion of the housing structure is formed to define an internally threaded opening 356 that receives an externally threaded adjustment element 358. A lock nut 360 is received by the external threads of adjustment element 358 and serves to lock the adjustment element at desired positions thereof. The compression of the spring 350 determines the opening pressure of each of the valve mechanisms 310 and 312 and, thus each of the of valves may be individually adjusted by means of the adjustment elements 358 so as to provide for selective opening pressures. It is not necessary that the opening pressures of the valves be identical. The opening pressures may be individually set depending upon the characteristics of flow desired in either direction through the fluid interchange conduit. Within the valve body structure 300 is defined a pair of ports 362 and 364 that communicate respective ones of the valve chambers to conduits 168 and 174.

Operation of the relief valve mechanism of FIG. 14 is as follows: Assuming that flow of fluid occurs in the direction of the flow arrows and the opening pressure of valve 312 is exceeded, the plunger sleeve 328 will shift to the left after the sealing element 340 has separated from the seat surface 342. Depending upon the pressure encountered, the sleeve element may move completely to the left and may engage the stop shoulder 329. After this has occurred, flow of fluid from conduit section 174 will flow through port 362 across the valve seat 342 and bore 308, whereupon the flowing fluid will enter conduit section 168 through bore 302. As shown with respect to relief valve structure 310, the sleeve elements 328 are each formed to define a plurality of apertures 366. With the direction of fluid flow as shown in FIG. 14, the pressurized fluid medium will enter the valve receptacle bore 306 and will pass through apertures 366 into the interior of the sleeve element 328. Pressure within the sleeve element will act upon the surface area of the sleeve element defined by its seal with the seal surface thereby developing a force that urges the sleeve element of relief valve 310 into pressure enhanced sealing engagement with the seat surface.

In other words, fluid pressure opens one of the relief valves and simultaneously enhances the sealing ability of opposite relief valve. When the direction of fluid flow through the valve mechanism is reversed, the opposite situation will occur. Relief valve 310 will be susceptible of being opened if the fluid pressure exceeds the spring enhanced opening pressure thereof. At the same time, this direction of flow also creates a pressure induced force acting upon sleeve or plunger element 328 that forces the sealing element 340 thereof into pressure induced sealing engagement with seat surface 342. By employing a relief valve mechanism as illustrated in FIG. 14, it is not necessary to incorporate parallel conduit lines such as shown in FIG. 4. In the event different valve opening pressures are desired, depending upon the direction of fluid flow through the relief valve mechanism, this can be accomplished simply by adjusting the spring compression of each of the valve mechanisms as desired.

Double valve relief valve mechanisms may take other suitable forms and another of these forms is illustrated in FIG. 15 where a relief valve mechanism is shown generally at 370 having a relief valve body structure 372 to which dampening liquid displacement conduits 168 and 174 are connected by threading or by any other suitable means of connection. Internally, the valve body structure 372 is formed to define inlet and outlet passageways 374 and 376 that are in communication with a pair of valve chambers 378 and 380. Ports 382 and 384 are also defined within the valve body structure for the purpose of communicating the valve chambers with the inlet and outlet passageways 374 and 376, respectively.

Within each of the valve chambers is located a relief valve mechanism, illustrated generally at 386 and 388. For purposes of simplicity, only the structure of relief valve 388 will be discussed in detail since the relief valves 386 and 388 are of substantially identical construction. Relief valve 388 incorporates an elongated sleeve element 390 having perforations 392 formed therein. Sleeve element 390 also is formed to define a pair of annular seal grooves within which are located annular sealing elements 394 and 396. Sealing element 396 establishes sealing engagement with a cylindrical internal surface 398 defining a portion of the wall structure of the valve chamber 380. The opposite sealing element 394 establishes sealing engagement with an internal cylindrical surface 400 defined within a closure element 402 that is secured to the body structure 372 by means of bolts 404. An external sealing element 406 supported within an external groove formed in the closure element 402 establishes sealing engagement with the internal cylindrical surface 408 that cooperates with the closure structure to define the valve chamber 380.

A resilient check valve sleeve 410 is supported about the periphery of the perforated sleeve element 390 by a retainer band 412. The sleeve valve 410 is formed of a resilient material, such as rubber, viton or any other suitable elastomeric material, and is capable of yielding responsive to pressure to allow flow of fluid to occur through the perforations 392. As pressurized fluid flows through conduit 174, as shown by the flow arrow, fluid will flow through port 384 and will enter the sleeve element 390. The fluid will then unseat the flexible sleeve element 410 in the manner shown by check valve element 388 therefore allowing flow through the perforations 392 and into passage 374. Simultaneously, fluid from flow passage 174 will enter valve chamber 378 and will act upon the outer periphery of the resilient sealing element of check valve 386. When this occurs, the flexible sleeve type check valve will prevent fluid flow through valve 386.

Upon reversal of flow in conduits 168 and 174, fluid will act upon the outer periphery of the resilient sleeve 410 of check valve 388, causing it to seat positively thereby preventing any flow across the check valve 388. Simultaneously, this fluid will enter valve chamber 378 through port 382 and will act through the perforations on the inner periphery of the resilient sleeve valve of check valve 386. This will cause the valve sleeve to yield in the manner shown by valve 388, thereby allowing flow across check valve 386 into the valve chamber 378 and thence into the flow passage 376. By employing the plural check valve mechanism 370, a single conduit fluid displacement system may be incorporated for purposes of dampening rather than the parallel conduit circuitry illustrated in FIG. 2.

In view of the foregoing, it is apparent that the present invention is adapted to attain all of the objects and features hereinabove set forth, together with other features that are inherent from the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in any limiting sense.

What is claimed is:

1. A rotary lift-turn type diverter valve mechanism for controlling the flow of fluid, said valve mechanism comprising:

a valve body defining a frusto-conical valve chamber and defining inlet and outlet passages disposed in intersecting relation with said valve chamber;

a bonnet structure connected to said valve body and defining a closure for said valve chamber;

a frusto-conical diverter valve element being positioned for both linear and rotary movement within said valve chamber and including a valve stem extending in sealed relation through said bonnet and a trunnion extending in coaxial relation with said valve stem and being journaled for rotation and linear movement relation to said valve body, said diverter element cooperating with said valve chamber in the seated position of said plug element to define a first valve chamber space between the larger extremity of said plug element and said valve body and a second chamber space between the smaller opposite extremity of said diverter element and said valve body;

pressure multiplying means is provided for introducing fluid pressure into the first valve chamber space for development of a resultant force acting on said diverter element to enhance the sealing ability thereof, said pressure multiplying means having an inlet portion thereof in fluid communication with at least one of the inlet and outlet passages of said valve mechanism and having an outlet portion thereof in fluid communication with said first valve chamber space, said pressure multiplying means having a piston housing being formed to define a piston chamber, and a piston element being movably disposed within said piston chamber and cooperating with said piston housing to define first and second pressure responsive piston areas, said first pressure responsive piston area being larger than said second piston area and being acted upon by the pressure of said one of said inlet and outlet passages, the fluid pressure within said first valve chamber space acting upon said second piston area.

2. A rotary lift-turn type diverter valve mechanism as recited in claim 1 wherein:

pressure from said one of said inlet and outlet passages acts upon said larger piston area of said piston and causes said second area of said piston to develop a pressure within said first valve chamber space that exceeds said pressure of said one of said inlet and outlet passages.

3. A rotary lift-turn type diverter valve mechanism as recited in claim 1, wherein:

said piston chamber is formed to define a large extremity and a small extremity;

means communicating said small extremity of said piston housing with said valve chamber and communicating said large extremity of said piston housing with said flow passage of said valve mechanism; and said piston element defining a large piston extremity forming said first pressure responsive area and defining a small extremity forming said second pressure responsive area, said small piston extremity being received within said small extremity of said piston housing and said large piston extremity being received within said large extremity of said piston housing.

4. A rotary lift-turn type diverter valve mechanism for controlling the flow of fluid, said valve mechanism comprising:

a valve body defining a frusto-conical valve chamber and defining inlet and outlet passages disposed in intersecting relation with said valve chamber, an accumulator housing being defined by said valve body and having a trunnion receptacle formed therein;

a bonnet structure being connected to said valve body and defining a closure for said valve chamber;

a frusto-conical diverter element being movably positioned for both rotational and vertical movement with said valve chamber and including a valve stem extending in sealed relation through said bonnet and a trunnion extending in coaxial relation with said valve stem and being journaled for rotation relative to said valve body, said trunnion extending into said trunnion receptacle, said diverter element in the seated position thereof defining a first sealed valve chamber space between one extremity of the diverter element and the valve body and defining a second valve chamber space between the opposite extremity of said valve chamber and the valve body;

seal means establishing a seal between said trunnion and said accumulator housing and cooperating with said trunnion and accumulator housing to define an accumulator chamber located outwardly of the free extremity of said trunnion, the volume of said accumulator chamber being varied by the position of said trunnion within said trunnion receptacle;

first bypass passage means allowing unidirectional flow of fluid from said accumulator chamber to said first valve chamber space;

second bypass passage means allowing unidirectional flow of fluid from said second valve chamber space to said accumulator chamber; and pressure passage means allowing unidirectional flow of fluid from one of said inlet and outlet passages to said first valve chamber space.

5. A rotary lift-turn type diverter valve mechanism as recited in claim 4, wherein:

accumulator piston means is movably positioned with said trunnion receptacle; and spring means is positioned within said trunnion receptacle and urges said accumulator piston means toward said trunnion, said piston means yields as said trunnion is moved toward said accumulator piston responsive to linear movement of said diverter element.

* * * * *